United States Patent [19]

Schmidt et al.

[11] 4,182,697
[45] Jan. 8, 1980

[54] PROCESS FOR THE PREPARATION OF BORON-CONTAINING PHENOL-FORMALDEHYDE RESINS

[75] Inventors: Manfred Schmidt; Dieter Freitag, both of Krefeld; Hermann Fries, Bergisch-Gladbach; Erich Esch, Leverkusen, all of Fed. Rep. of Germany

[73] Assignee: Bayer Aktiengesellschaft, Fed. Rep. of Germany

[21] Appl. No.: 9,121

[22] Filed: Feb. 2, 1979

[30] Foreign Application Priority Data

Feb. 8, 1978 [DE] Fed. Rep. of Germany ....... 2805180

[51] Int. Cl.$^2$ ............................ C08G 8/30; C08G 8/32
[52] U.S. Cl. ......................... 260/19 R; 260/3.19 UA; 260/19 N; 260/23.7 M; 525/506; 525/508
[58] Field of Search ............ 260/19 R, 19 N, 19 UA, 260/23.7 M; 528/134, 136

[56] References Cited

U.S. PATENT DOCUMENTS

| | | | |
|---|---|---|---|
| 2,022,827 | 12/1935 | Ruben | 260/19 N X |
| 3,487,045 | 12/1969 | Shepard et al. | 528/134 X |
| 4,073,757 | 2/1978 | Schmidt et al. | 260/19 R |

*Primary Examiner*—Howard E. Schain
*Attorney, Agent, or Firm*—Connolly and Hutz

[57] ABSTRACT

The invention relates to a process for the preparation of boron-containing phenol/formaldehyde resins be reacting diphenylol alkane novolaks with unsaturated fatty acids or fatty acid esters and boron compounds, characterized in that diphenylol alkane novolaks having a molecular weight of from 400 to 1600 are reacted with from 15 to 35 parts by weight of an unsaturated fatty acid or its esters, accompanied by the azeotropic removal of water, and then with from 20 to 100 parts by weight of a boric acid trialkyl ester containing from 1 to 4 carbon atoms per alkyl group or with 14 to 72 parts by weight of a boric acid alkyl ester anhydride of the general formula $(RO)_2B-O-B-(OR)_2$ with 1 to 4 carbon atoms per alkyl group R or with from 10 to 50 parts by weight, preferably from 15 to 20 parts by weight of boron trioxide or with from 18 to 90 parts by weight, preferably from 25 to 36 parts by weight of boric acid in the presence of a $C_1-C_4$ alcohol.

6 Claims, No Drawings

PROCESS FOR THE PREPARATION OF BORON-CONTAINING PHENOL-FORMALDEHYDE RESINS

German Offenlegungsschrift No. 2,557,613 describes boron-containing phenol/formaldehyde resins which may be obtained by partially transesterifying a novolak with boric acid, boron trioxide or boric acid alkyl ester, followed by reaction with unsaturated fatty acids. In another known process, the novolak is simultaneously reacted with the boron component and the unsaturated fatty acid. The novolak used for transesterification with the unsaturated fatty acid and the boron compound are obtained by the acid-catalysed reaction of aldehydes with diphenylol alkanes or diphenylol alkane mixtures of diphenylol alkanes with hydroxy phenyl hydroxy indanes and have average molecular weights $\overline{M}_{OS}$ of from 400 to 1600.

The thus-obtained resins have iodine numbers of from 80 to 200, OH-numbers of from 200 to 500, a boron content of up to 7%, by weight, and a softening point of from 50° to 150° C.

These resins may be hardened in the presence of formaldehyde donors, such as hexamethylene tetramine, paraformaldehyde and trioxy or tetraoxy methylene, and are used, for example, as reinforcing resins for rubber.

In the described process, the water liberated during the production of the novolak to be esterified with the boric acid component and also the water entrained into the reaction mixture by the formalin which may be used are azeotropically distilled off by a solvent acting as solution promoter, such as toluene or isobutanol. The disadvantage of this is the long distillation time required for the azeotropic removal of water. Since the viscosity of the reaction mixture increases during the azeotropic removal of water, mixing is less intensive and results in an increasingly poorer transfer of heat, so that the azeotropic distillation rate is drastically reduced. In addition, a considerable portion of the total reaction time is taken up by the necessary transesterification of the viscous novolak solution with the above-mentioned boron compound and the resulting need for repeated azeotropic distillation. Accordingly, the viscosity of the reaction mixture undergoes a further increase.

Increasing the quantity of solvent as a counter-acting measure cannot contribute towards reducing the reaction time because experience has shown that a relatively large quantity of solvent reduces the velocity of the transesterification reaction, in addition to which an additional excess of solvent has to be removed from the reaction mixture by distillation before the resin solution is worked-up.

It has now been found that this disadvantage may be obviated by adding suitable unsaturated fatty acids or fatty acid esters to the reaction mixture before the azeotropic removal of water from the novolak is actually commenced and then further reacting the reaction mixture with boron compounds.

By reversing the procedure in this way, the water present in the reaction mixture is removed much more quickly under the viscosity-reducing influence of the fatty acid or fatty acid ester, which is exerted from the outset, without the optimal quantitative ratios between the reaction components having to be altered in any way and without the constitution of the resin and its valuable properties undergoing any changes. The time required for the removal of water from the novolak resin may be considerably reduced in this way. At the same time, the reaction time required for reacting the boron component with the reaction mixture accompanied by the azeotropic removal of warter is considerably reduced.

Accordingly, the present invention relates to a process for the production of boron-containing phenol/formaldehyde resins by reacting diphenylol alkane novolaks with unsaturated fatty acids or fatty acid esters and boron compounds, which is characterized in that diphenylol alkane nolovaks having an average molecular weight (as determined by osmometry) $\overline{M}_{OS}$ of from 400 to 1600, preferably from 600 to 1200, are reacted with from 15 to 35 parts, by weight, of an unsaturated fatty acid or an ester thereof, accompanied by the azeotropic removal of water, and subsequently with from 20 to 100 parts, by weight, of a boric acid trialkyl ester containing from 1 to 4 carbon atoms per alkyl group or with 14 to 72 parts by weight of a boric acid alkyl ester anhydride of the general formula $(RO)_2$—B—O—B$(OR)_2$ with 1 to 4 carbon atoms per alkyl group or with from 10 to 50 parts by weight, preferably from 15 to 20 parts, by weight, of boron trioxide or with from 18 to 90 parts, by weight, preferably from 25 to 36 parts, by weight, of boric acid in the presence of a $C_1$–$C_4$ alcohol.

The boron-containing resins obtainable by this process are soluble in methanol, ethaol, propanol, isopropanol, butanol, isobutanol, dioxane, tetrahydrofuran, acetone, methylethyl ketone, ethyl acetate, butyl acetate and methyl and ethyl glycol acetate and have an iodine number of from 80 to 200, preferably from 110 to 170, an OH-number of from 200 to 500, preferably from 240 to 450, and a boron content of up to 7%, by weight, preferably from 1.5 to 5%, by weight. The softening point range of the resins is from 50° to 150° C., preferably from 55° to 110° C.

The diphenylol alkane novolak may be represented by the following general formula:

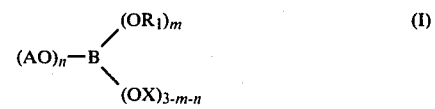

wherein
m and n each represent numbers of from 1 to 2, such that $m+n \leq 2$;
A represents $C_1$–$C_4$ alkyl, such as methyl, ethyl, propyl, butyl;
$R_1$ represents A or X; and
X represents a novolak which is formed by condensing an aldehyde with a diphenylol alkane or with a mixture of diphenylol alkanes and (hydroxyphenyl) hydroxy indanes in the presence of acid catalysts and which still contains free phenolic OH-groups.

The novolaks may be produced from diphenylol alkanes or from mixtues of diphenylol alkanes corresponding to general formula (II) below as described, for example, in DE-AS No. 1,235,894:

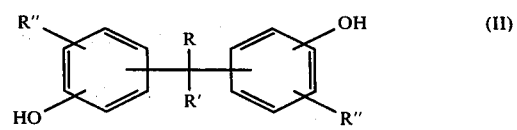

wherein
R represnts $C_1$-$C_8$ alkyl or $C_3$-$C_{12}$ cycloalkyl; 'R' represnts H or R; or R and R' together represents $C_4$-$C_7$ alkylene, in which case R and R' complete a carbocyclic ring with the carbon atom to which they are attached; and R'' represents H or $C_1$-$C_4$ alkyl.

The novolaks may also be produced from mixtures of diphenylol alkanes corresponding to above general formula (II) with hydroxyphenyl hydroxy indanes corresponding to general formula (III) below, of the type obtained as residual resins (so-called "primary tesins") in the synthesis of bisphenol A:

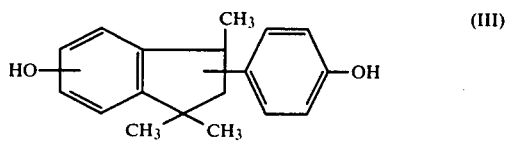
(III)

It is preferred to use bisphenol A or a mixture of bisphenol A isomers with hydroxyphenyl hydroxy indanes corresponding to general formula (III) above, the ratio, by weight, of the bisphenol A isomers to the hydroxyphenyl hydroxy indanes of above general formula (III) amounting to from 4:1 to 9:1, preferably from 6:1 to 8:1.

The diphenylol alkane or diphenylol alkane mixture is reacted in knowm manner with from 100 to 140 mole %, preferably from 120 to 130 mole %, of an aldehyde at boiling temperature both in the presence of from 10 to 150 parts, by weight, preferably from 15 to 80 parts, by weight, of an organic solvent (based on 100 parts, by weight, of diphenylol alkane), such as benzene, toluene, xylene, ethyl acetate, butyl acetate, methyl glycol or ethyl glycol acetate or $C_1$-$C_4$ alcohols, and in the presence of from 0.01 to 1 mole %, preferably 0.5 mole %, (based on 100 mole % of phenolic OH), of an acidic organic or inorganic catalyst or mixtures thereof. The reaction time, generally, amounts to from about 20 minutes to 2 hours, preferably from 30 minutes to 1 hour. It is preferred to use toleuen, butanol or isobutanol.

Suitable aldehydes includes: chloral, furfurol, propionaldehyde, butyraldehyde, acetaldehyde and formaldehyde. It is preferred to use aqueous formaldehyde solution (formalin), trioxane or paraformaldehyde.

The acidic catalysts used include solid and liquid organic acids, such as oxalic acid, succinic acid, formic acid, acetic acid, lactic acid and p-toluene sulphonic acid. Inorganic acids, such as hydrochloric acid, hydrobromic acid and phosphoric acid, as well as mixtures of the above organic and inorganic acids may also be used. It is preferred to use p-toluene sulphonic acid, oxalic acid or phosphoric acid.

From 15 to 35 parts, by weight, preferably from 20 to 37 parts by weight (based on 100 parts, by weight, of diphenylol alkane or diphenylol alkane mixture) of the unsaturated fatty acid or its ester are added to the novolak produced and the water present in the reaction mixture is azeotropically removed. The heating bath temperature which is required for this purpose may amount to from 100° to 200° C., preferably from 130° to 170° C. Distillation may be carried out under normal pressure or in vacuo.

The following are examples of the compounds which may be used as unsaturated fatty acids or esters thereof: linseed oil fatty acid, soya bean oil fatty acid, tall oil fatty acid, peanut oil fatty acid, technical conjugated unsaturated fatty acid, such as "Conjuen" fatty acid (a trade name of the Henkel company of Dusseldorf), ricinoleic acid, ricinene fatty acid or mixtures thereof, also glycerides or glyceride mixtues thereof or methyl ester or methyl ester mixtures thereof.

It is preferred to use linseed oil fatty acid, soy a bean oil fatty acid, conjuenfettsaure or castor oil.

The unsaturated fatty acids or the esters thereof preferably have iodine number of greater than 40.

The subsequent reaction of the modified diphenylol alkane novolaks with the boron compounds may be carried out as follows: from 10 to 120 parts by weight, preferably from 15 to 100 parts, by weight, (based on 100 parts, by weight, of diphenylol lakane, or diphenylol alkane mixture) of an alcohol corresponding to the following general formula: ROH (wherein R represents a straight- or branched-chain $C_1$-$C_4$ alkyl group, such as methyl, ethyl, propyl, isopropyl, butyl, isobutyl, tert.-butyl, but preferably ethyl or butyl) are introduced into the disphenylol alkane novolak solution.

From 10 to 50 parts, by weight, preferably from 15 to 20 parts, by weight, of boron trioxide, or from 18 to 90 parts, by weight, preferably frpm 25 to 36 parts, by weight, of boric acid are added to the alcoholic solution of the novolak, followed by reaction over a period of from 30 minutes to 3 hours at reflux temperature to form a mixed aliphatic-aromatic boric acid ester, water being azeotropically distilled off from the reaction mixture during the reaction.

Instead of boron trioxide or boric acid, it is, of course, also possible to use separately synthesised boric acid alkyl esters.

Boric acid alkyl esters are compounds corresponding to the following general formula: $B(OR)_3$ wherein R represents a $C_1$-$C_4$ alkyl radical, such as methyl, ethyl, propyl, isopropyl, butyl or isobutyl.

Where separately synthesised boric acid esters $B(OR)_3$ are used, there is no need for the preliminary additon of an alcohol ROH containing a $C_1$-$C_4$ alkyl group. Boric acid semiesters corresponding to one of the following general formulae: $(RO)_2B-OH$ or $(RO)-B(OH)_2$ may also be used. Instead of the boric acid trialkylesters it is, of course, also possible to use separately synthesised boric acid alkyl ester anhydride of the general formula $(RO)_2B-O-B(OR)_2$ in an amount of 14 to 72 parts by weight with 1 to 4 carbon atoms per alkyl group R. R represents preferably a butyl group.

In this process for producing the boron-containing resins, the reaction time is reduced by from 40 to 50% in relation to the process described in DE-OS No. 2,557,613. The boron-containing reinforcing resin may be isolated by various technical processes, such as concentration of the resin solution by evaporation in the reaction vessel under normal pressure or in vacuo, in which case increasing heating bath temperature may be applied. In this process, the resin is run off from the reaction vessel in liquid form and, after hardening, is ground.

In a preferred embodiment, the resin is isolated by concentrating the resin solution by evaporation in a tubular coil evaporator, in which case it is possible to work both with an inert gas, such as nitrogen, as purging agent and also without an inert gas in vacuo. The evaporator temperature reqired is determined by the vacuum applied, and may amount to from 120° to 220° C. The liquid resin discharged by gear pumps may be converted into granulate ready for processing by methods known to those skilled in the art, for exemple, using a cooling cylinder or a cooling belt. The liquid resin discharged from the evaporator may also be worked-up by direct head granulation in the presence of cooling water or cooling air.

The resin produced by the process according to the present invention may also be readily isolated from its solution using an evaporation screw.

Where they are to be used as reinforcing resins for natural and/or synthetic rubbers, the resins produced may be worked into the rubbers in mixing units of the type normally used for processing rubber, such as mixing rolls, kneaders and high-speed mixers, in the presence of a formaldehyde donor, such as hexamethylene tetramine, paraformaldehyde and trioxy or tetraoxy methylene. Working in is carried out at temperatures of from 70° to 120° C., preferably from 80° to 100° C.

The following are mentioned as examples of natural and/or synthetic rubbers: natural rubber, styrene-butadiene rubber, chloroprene rubber, nitrile rubber, isoprene rubber, butadiene rubber, EPDM, butyl rubber and trans-polypentenamer rubber.

The conventional fillers, such as active silicas, carbon black, kaolin, chalk, also anti-agers, crosslinking agents, vulcanisation accelerators and other conventional auxiliaries, may be added to the rubbers.

The resins according to the present invention are added to the rubbers in quantities sufficient to produce a reinforcing effect. These quantities are preferably from 5 to 100 parts, by weight, and, with particular preference, from 10 to 60 parts, by weight, of the resin according to the present invention per 100 parts, by weight, of rubber.

The thus-produced rubber mixtures may be processed in the conventional way, for example by moulding, extrusion or calendering, to form mouldings, such as soles, rollers, floor coverings and sealing rings. Vulcanisation may be carried out in the conventional way, for example in a press, in steam, in a hot air duct or in a salt bath at temperatures of from 130° to 210° C.

The present invention is illustated by the following Examples:

EXAMPLE 1

(Comparison Example: corresponding to Example 3 of DES-OS No. 2,557,613)

The "primary resin" obtained in the synthesis of bisphenol A (a mixture of bisphenol A isomers with hydroxyphenyl hydroxy indane and hydroxyphenyl hydroxy chromane isomers in a ratio, by weight, of approximately 7:1:1) is used for the reaction.

1.24 kg of primary resin are suspended in 700 ml of toluene, 25 g of oxalic acid are added to the resulting suspension, followed by the introduction, with intensive stirring, under nitrogen, at reflux temperature, of 550 g of 35% formalin. The mixture is then left to react for 30 minutes at reflux temperature, after which 2 g of phosphoric acid (85%) are added and the mixture left to react for another 15 minutes. 440 ml of water are then azeotropically distilled off (time: 3 hours). 1 kg of ethanol is introduced, resulting in the formation of a homogeneous solution to which 200 g of boron trioxide are added. After reaction under reflux for 2 hours, approximately 80% of the total quantity of solvent is distilled off under normal pressure (distillation time: 3.5 hours).

At the same time, another 80 ml of water are separated off. 300 g of "Conjuen" fatty acid are added to the reaction mixture. The mixture is then left to react for 15 minutes at a bath temperature of 150° C. The residual solvent and residual quantities of water are then distilled off in vacuo (time: from 30 minutes to 1 hour). The residual, viscous resin is removed from the reaction vessel and, after hardening, is ground. 1.7 kg of resin are obtained.
Softening point: 76° C.
Iodine number: 143
OH-number: 450
Boron: 2.7%
Total reaction time: 10 hours.

EXAMPLE 2

1.24 kg of primary resin are suspended in 700 ml of toluene and 25 g of oxalic acid are added to the resulting suspension which is then reacted, with intensive stirring, under nitrogen, at reflux temperature, with 550 g of 35% formalin. The mixture is then left to react under reflux for 30 minutes, 2 g of phosphoric acid (85%) and 300 g of "Conjuen" fatty acid are added and, immediately afterwards, 440 ml of water are distilled off (time: 2 hours). 1 liter of ethanol and 200 g of boron trioxide are introduced into the low viscosity solution which is then left to react for 1 hour at reflux temperature. Most of the solvent mixture of toluene and ethanol is then distilled off under normal prressure (time: 100 minutes). At the same time, another 80 ml of water are separated off. The residual solvent is then removed in vacuo at a bath temperature increasing to 150° C., after which the resin is subsequently discharged under pressure from the reaction vessel. 1.7 kg of resin are obtained, the resin being ground after hardening.
Softening point: 75°-77° C;
total reaction time: 5.75 hours
Time saved in relation to Example 1: 4.25 hours
Iodine number of the resin: 143
OH-number: 446–452
Boron: 2.7%.

The hardening resins obtained in accordance with Example 1 and Example 2 are worked into a conventional rubber mixture based on SBR (styrene-butadiene rubber) and the hardening effect or rather the positive change in the mechanical properties of the vulcanisates produced from these rubber mixtues is compared with the effects obtained using conventional styrene-butadiene resins (containing approximately 85% of styrene) in SBR.

Mixtures based on SBR (A, B, C, D) are produced in accordance with the following basic formulation and are then processed into vulcanisates having the physical properties shown below. The values of the crude mixtures are also quoted in order to demonstrate the processing behaviour under the influence of the resins.

| Mixtures | A parts, by weight | B parts, by weight | C parts, by weight | D parts, by weight |
| --- | --- | --- | --- | --- |
| SBR (Buna Huls 1507) | 100.0 | 100.0 | 100.0 | 100.0 |
| Stearic acid | 2.0 | 2.0 | 2.0 | 2.0 |
| Active zinc oxide | 3.0 | 3.0 | 3.0 | 3.0 |
| Silica | 30.0 | 30.0 | 30.0 | 30.0 |
| Diethyl glycol | 2.5 | 2.5 | 2.5 | 2.5 |
| Anti-ager | 1.5 | 1.5 | 1.5 | 1.5 |

-continued

| Mixtures | A parts, by weight | B parts, by weight | C parts, by weight | D parts, by weight |
|---|---|---|---|---|
| Sulphur | 2.2 | 2.2 | 2.2 | 2.2 |
| Dibenzothiazoyl-disulphide | 2.2 | 2.2 | 2.2 | 2.2 |
| Tetramethyl thiouram disulphide | 0.75 | 0.75 | 0.75 | 0.75 |
| Styrene resin (Duranit B) | — | 30.0 | — | — |
| Hexamethylene tetramine | — | — | 3.6 | 3.6 |
| Hardening resin (according to Example 1) | — | — | 30.0 | — |
| Hardening resin (according to Example 2) | — | — | — | 30.0 |

Physical properties of the crude mixtures
Viscosity (Defo hardness/ 400/20 500/23 725/17 722/17 elasticity)
according to DIN 53 514
Physical properties of the vulcanisates after vulcanisation of 4 mm test specimens
(vulcanisation for 30 minutes at 150° C.)

| | according to DIN | Mixtures | | | |
|---|---|---|---|---|---|
| | | A | B | C | D |
| Tensile strength (MPA) | 53 504 | 4.7 | 7.2 | 6.1 | 6.1 |
| Elongation at break (%) | 53 504 | 350 | 350 | 325 | 326 |
| Modulus 100% (MPA) | 53 504 | 1.6 | 1.9 | 3.9 | 3.9 |
| Hardness (Shore A at 20° C./75° C. | 53 505 | 63/62 | 68/58 | 87/80 | 87/81 |
| Shock elasticity (% at 20° C./75° C. | 53 512 | 51/61 | 46/52 | 48/51 | 48/50 |
| Structural strength | according to Pohle | 60 | 80 | 100 | 100 |

We claim:

1. In the process for preparing a boron-containing phenol/formaldehyde resin by reacting a diphenylol alkane novolak with an unsaturated fatty acid or unsaturated fatty acid ester and a boron compound, the improvement comprising reacting a diphenylol alkane novolak having a molecular weight of from 400 to 1600 with from 15 to 35 parts by weight of an unsaturated fatty acid or unsaturated fatty acid ester while azeotropically removing water and then reacting resulting product with a boron compound selected from the group consisting of
   (a) from 20 to 100 parts by weight of a boric acid trialkyl ester having from 1 to 4 carbon atoms in each alkyl moiety,
   (b) from 14 to 72 parts by weight of a boric acid alkyl ester anhydride of the formula $(RO)_2B-O-B(OR)_2$ wherein R is alkyl having 1 to 4 carbon atoms,
   (c) from 10 to 50 parts by weight of boron trioxide and
   (d) from 18 to 90 parts by weight of boric acid in the presence of an alkanol having 1 to 4 carbon atoms.

2. A process as claimed in claim 1 wherein the reaction of the novolak with the unsaturated fatty acid or ester thereof and the boron compound is carried out in an alcoholic solvent.

3. A process as claimed in claim 2 wherein said reaction is carried out under reflux for from 30 minutes to 3 hours.

4. A process as claimed in claim 1 wherein reaction with the boron compound is carried out at a temperature of from 100° to 200° C.

5. A process as claimed in claim 1 wherein reaction with the boron compound is carried out at a temperature of from 130° to 170° C.

6. A process as claimed in claim 1 wherein the diphenylol alkane novolak is the reaction product of an aldehyde with a diphenylol alkane of the formula

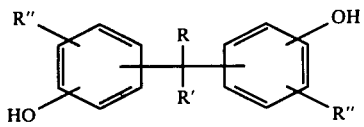

wherein R taken separately is alkyl having 1 to 8 carbon atoms or cycloalkyl having 3 to 12 carbon atoms; R' taken separately is hydrogen or R; or R and R' taken together with the carbon atom to which they are attached complete a 5 to 8 carbon atom carbocyclic ring; and R" is hydrogen or alkyl having 1 to 4 carbon atoms or sid novolak is the reaction product of an aldehyde with a mixture of diphenylol alkane of said formula and an indane of the formula

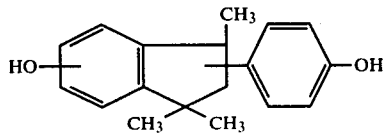

* * * * *